(12) United States Patent
Wang et al.

(10) Patent No.: US 11,909,592 B2
(45) Date of Patent: Feb. 20, 2024

(54) METHOD FOR MULTI-POLICY CONFLICT AVOIDANCE IN AUTONOMOUS NETWORK (71) Applicant: BEIJING UNIVERSITY OF POSTS AND TELECOMMUNICATIONS, Beijing (CN)

(72) Inventors: Jingyu Wang, Beijing (CN); Qi Qi, Beijing (CN); Zirui Zhuang, Beijing (CN); Yuebin Guo, Beijing (CN); Lingqi Guo, Beijing (CN); Tong Xu, Beijing (CN); Jing Wang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 18/115,453

(22) Filed: Feb. 28, 2023

(65) Prior Publication Data

US 2023/0412457 A1    Dec. 21, 2023

(30) Foreign Application Priority Data

Jun. 17, 2022   (CN) .......................... 202210692833.3

(51) Int. Cl.
*H04L 41/0894*  (2022.01)
*H04L 41/08*    (2022.01)

(52) U.S. Cl.
CPC ...... *H04L 41/0894* (2022.05); *H04L 41/0886* (2013.01)

(58) Field of Classification Search
CPC ... H04L 41/145; H04L 41/0873; H04L 41/40; H04L 41/24; H04L 41/0803;
(Continued)

(56) References Cited

U.S. PATENT DOCUMENTS 11,283,691 B1 *   3/2022   A .......................... H04L 41/145
2010/0131421 A1 * 5/2010   Kuester ................ G06Q 10/067
                                                                  705/348
(Continued)

FOREIGN PATENT DOCUMENTS

CN   103096353   5/2013
CN   106817275   6/2017
(Continued)

OTHER PUBLICATIONS

Zhou et al., "An Application-Oriented IPSec System Policy Management Mechanism", 2007, Computer Engineering & Science, vol. 29 No. 5, p. 15-18 and 49 (5 pages) with translation of abstract on p. 15.

(Continued)

*Primary Examiner* — Mahran Y Abu Roumi
(74) *Attorney, Agent, or Firm* — Daniel F. Nesbitt; Nesbitt IP LLC (57) ABSTRACT

A method for multi-policy conflict avoidance in an autonomous network comprising: collecting network state information; acquiring a set of multiple policies to be verified; constructing a policy ordering space tree containing all multi-policy execution sequences; performing a depth-first traversal on the policy ordering space tree, extracting a multi-policy execution sequence to be verified, then constructing an initial simulation data plane, injecting each policy in the multi-policy execution sequence into the simulation data plane one by one in sequence, and storing a simulation data plane after each policy is inserted; detecting whether there is a conflict in the simulation data plane generated after each policy is executed, inferring dependencies among multiple policies in the conflict policy sequence, pruning the policy ordering space tree, to efficiently select (Continued)

and update the multi-policy execution sequence avoiding conflicts.

6 Claims, 4 Drawing Sheets

(58) Field of Classification Search
CPC .............. H04L 41/0893; H04L 41/0866; H04L 41/0894; H04L 41/5019; H04L 63/0209; H04L 63/02; H04L 69/22; G06F 21/554; G06F 16/2246
See application file for complete search history.

(56) References Cited

U.S. PATENT DOCUMENTS

| | | | | |
|---|---|---|---|---|
| 2014/0293831 | A1* | 10/2014 | Han | H04L 41/0863 370/254 |
| 2016/0191466 | A1* | 6/2016 | Pernicha | H04L 63/20 726/1 |
| 2019/0253318 | A1* | 8/2019 | Leng | H04L 12/46 |
| 2020/0036593 | A1* | 1/2020 | Sethi | H04L 41/0894 |
| 2021/0351980 | A1* | 11/2021 | Huffman | G06F 21/554 |

FOREIGN PATENT DOCUMENTS

| | | |
|---|---|---|
| CN | 109889546 | 6/2019 |
| CN | 109906586 | 6/2019 |
| CN | 110099056 | 8/2019 |
| CN | 110225008 | 9/2019 |
| CN | 111490906 | 8/2020 |
| CN | 112448915 | 3/2021 |
| CN | 112470431 | 3/2021 |
| CN | 112565193 | 3/2021 |
| CN | 112636958 | 4/2021 |
| CN | 114039853 | 2/2022 |
| CN | 114095347 | 2/2022 |
| CN | 114465901 | 5/2022 |
| WO | 2016033963 | 3/2016 |
| WO | 2017020601 | 2/2017 |

OTHER PUBLICATIONS

Wang et al., "A Conflict and Redundancy Analysis Method for XACML Rules", Mar. 2009, Chinese Journal of Computers, vol. 32 No. 3, p. 516-530 (15 pages) with translation of abstract on p. 516.

Qu et al., "Resource control conflict detection mechanism in trustworthy and controllable network", Oct. 2010, Journal on Communications, vol. 31 No. 10, p. 79-87 (9 pages) with translation of abstract on p. 79.

Wu et al., "Approach for policy conflict detection based on decision tree model", Dec. 15, 2016, Journal of Computer Applications, vol. 36(S2), p. 6-10 (5 pages) with translation of abstract on p. 6.

Meng et al., "Conflict Analysis Based on GMC R-NPAWLAK Hybrid Model", Oct. 2017, Operations Research and Management Science, vol. 26 No. 10, p. 181-187 (7 pages) with translation of abstract on p. 181.

Chu et al., "Prefix-Graph: A Versatile Log Parsing Approach Merging Prefix Tree with Probabilistic Graph", Apr. 2021, EEE 37th International Conference on Data Engineering (ICDE), p. 2411-2422 (12 pages).

Wang et al., "Knowledge-defined intent-based network autonomy", Sep. 2021, Telecommunications Science, vol. 37 No. 9, p. 1-13 (13 pages) with translation of abstract on p. 1-2.

Notice of Allowance and Search Report dated Jun. 20, 2023 in corresponding Chinese Application No. 202210692833.3 filed Jun. 17, 2022 (7 pages).

* cited by examiner

METHOD FOR MULTI-POLICY CONFLICT AVOIDANCE IN AUTONOMOUS NETWORK

CROSS-REFERENCE TO RELATED APPLICATION

The present application claims the benefit of Chinese Patent Application No. 202210692833.3, filed Jun. 17, 2022, the entirety of which is hereby incorporated by reference.

TECHNICAL FIELD

The invention relates to a method for multi-policy conflict avoidance in an autonomous network, belonging to the field of communications.

BACKGROUND

An autonomous network is developed in response to the development of network intellectualization, which is intended to build automation during a whole life cycle of a network and create a digital and intelligent operation and maintenance capability called "self-configuration, self-repair and self-optimization". At the same time, an intent is introduced into the autonomous network, which is used to express user needs, goals and constraints, allowing a system to adjust an operation mode accordingly, translating the intent into a network configuration policy, and actually deploying applications.

In order to avoid network security risks or even network paralysis, the policy should be strictly verified before being updated, regardless of whether the policy is generated based on "self-configuration, self-repair, self-optimization" of a network environment or the policy is obtained by translating according to the intent. Generally, existing schemes determine feasibility of the network policy by constructing a simulation network and simulating whether there is a conflict in the simulation network after the policy is updated to the simulation network. If there is a conflict, an early warning is given and it is attempted to solve the conflict.

The autonomous network usually needs to automatically generate and deploy multiple configuration policies at one time so as to cope with global changes in the network. At the same time, when analyzing the user intent, the autonomous network often translates and configure the user intent as multiple policies. At present, the autonomous network architecture and related methods are usually a Software-Defined Network (SDN) architecture. Since the network is a complex system with many distributed switches, a controller can only configure and modify one switch at a certain time. Therefore, the updating process of multiple policies is sequential. When a network deploys multiple policies, it needs to go through a series of intermediate states to achieve an expected final configuration.

The Chinese patent application CN 202011464295.X (title of the application: a technology intended to drive automated verification of policies in a network; filing date: Dec. 12, 2020; applicant: Northeastern University) discloses a technology intended to drive automated verification of policies in a network, and proposes a corresponding solution to various problems occurred in the implementation of policies. First, for a situation in which an intent index and performance parameters in the user intent after translated may violate the user intent, a formal verification-based method is designed to verify inconsistencies of policies caused by intent translation. Secondly, for a situation in which the policies conflict with existing policies in a network when the policies are updated, a method of policy conflict verification based on flow rules is designed. At last, for a situation in which underlying network resources are not enough to meet the user needs and thus the policy implementation violates the user intent, a method of resource availability verification based on a real-time database is designed. However, this solution only verifies whether there is a conflict with the existing policies when all of the multiple policies are updated. On the one hand, there is a lack of verification on whether there is conflict such as packet circulation and a firewall conflict in intermediate states of a network during updating of multiple policies; on the other hand, it is impossible to select a correct execution sequence avoiding conflicts according to dependencies among the multiple policies to be verified.

Therefore, it has become a technical problem focused on by technicians of how to verify an abnormality of intermediate states of a network during updating of multiple policies and efficiently select a correct execution sequence avoiding conflicts according to dependencies among the multiple policies to be verified at the same time.

SUMMARY

In view of this, the invention provides a method for multi-policy conflict avoidance in an autonomous network, which can verify an abnormality of intermediate states of a network during updating of multiple policies and efficiently select a correct execution sequence avoiding conflicts according to dependencies among the multiple policies to be verified at the same time.

The invention provides a method for multi-policy conflict avoidance in an autonomous network, including:
  step 1: collecting network state information, wherein the network state information includes a network topology, configuration information and network data in a network traffic;
  step 2: acquiring a set of multiple policies to be verified;
  step 3: generating all multi-policy execution sequences based on the set of multiple policies, and then constructing a policy ordering space tree containing all multi-policy execution sequences by using a data tree structure, wherein a node of the tree represents a network state, an edge represents a network command, and a path from a root to a leaf represents a sequential execution process of a network starting from an initial state according to network commands on edges, and wherein each of the multi-policy execution sequences is transformed into a path from the root to a leaf node of the tree;
  step 4: performing a depth-first traversal on the policy ordering space tree, extracting a multi-policy execution sequence to be verified from the policy ordering space tree; then taking the network state information of step 1 as the initial state of the network, and formally simulating a forwarding table of each network element in the network by using software, so as to construct an initial simulation data plane; then injecting each policy in the multi-policy execution sequence to be verified into the simulation data plane one by one in sequence; simulating and calculating a simulation data plane generated after each policy is executed; and storing all generated simulation data planes;
  step 5: detecting whether there is a conflict in the simulation data plane generated after each policy in the multi-policy execution sequence to be verified is executed; forming a conflict policy sequence according thereto; then inferring dependencies among multiple policies in the conflict policy sequence; pruning the policy ordering space tree; finally selecting the multi-policy execution sequence avoiding conflicts; and updating the multiple policies to an actual network data plane in sequence.

Compared with the prior art, the invention has the following beneficial effects. A network needs to go through a series of intermediate states to achieve an expected final configuration when deploying multiple policies, and existing policy verification work only verifies whether a final state of the network causes a network abnormality when all network policies are deployed, but lacks verification of each intermediate state of the network when a whole policy set is updated one by one. However, the invention not only verifies the network stability after all network policies are deployed, but also ensures that there is no abnormality in the network during updating of the multiple policies one by one. For a situation in which there is a policy conflict in the network during updating of the multiple policies, the invention can efficiently calculate and obtain the correct multi-policy execution sequence to avoid the conflict. The set of multiple policies with the number of policies n has n! ordering schemes in total, and time complexity of direct traversal is very high. The invention mines the dependencies among multiple policies. When it is verified and found that the current ordering scheme conflicts, the invention is not easy to backtrack, and attempt to determine a correct policy sequence subset or minimal policy conflict subset by deleting pre-policies of an error policy and introducing an unexecuted policy and the like, and prunes the policy ordering space tree according thereto. The policy verification has a maximum time overhead in simulating the injection of a new rule and generating a simulation data plane. The invention speeds up the verification process from the perspective of reducing the repeated generation of the simulation data plane. When verifying n multiple policies executed in a certain sequence, respective simulation data planes, totaling n, after each policy is injected one by one is recorded. When verifying a new ordering, it is preferred to check whether the existing simulation data plane records can be directly used or whether it can be updated based on the existing records, so as to improve a verification speed.

DETAILED DESCRIPTION

In order to make the technical solutions and advantages of the present invention clearer, the present invention is further described in detail below with reference to the accompanying drawings.

Figure 1:
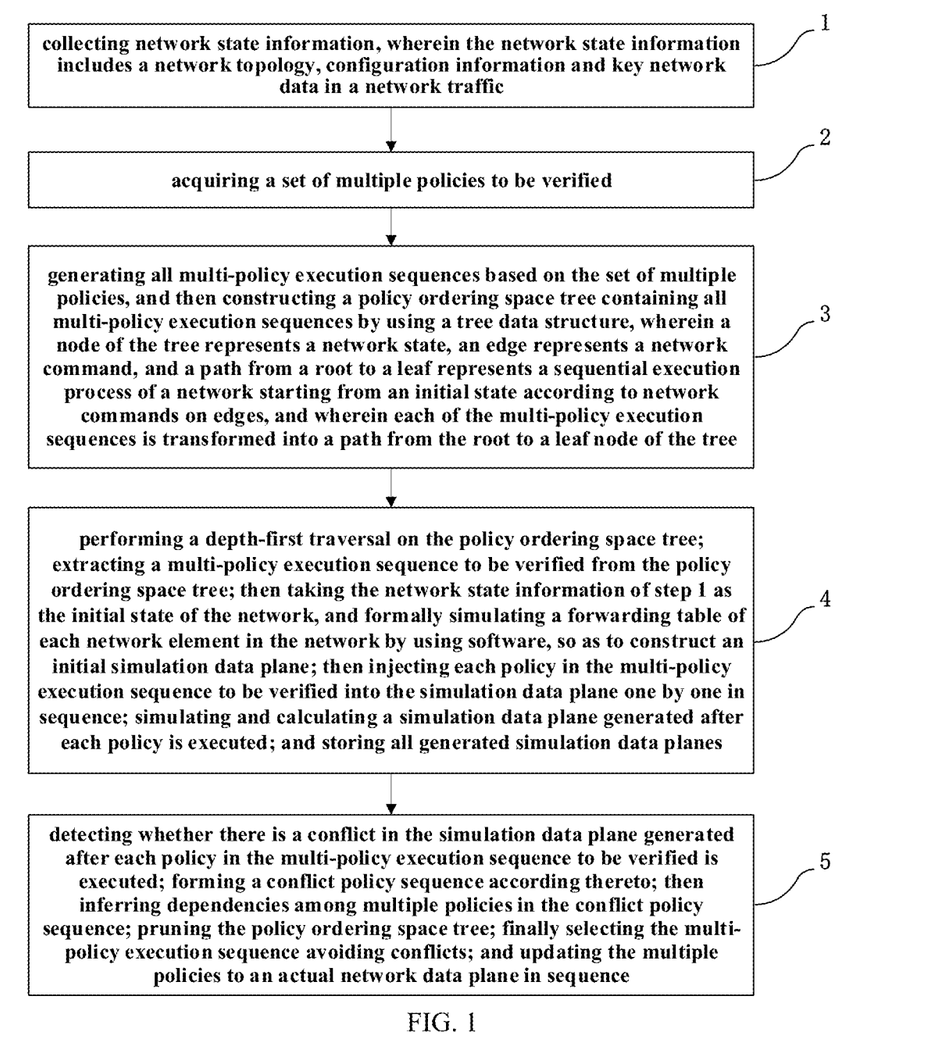
FIG. 1 is a flowchart of a method for multi-policy conflict avoidance in an autonomous network of the invention.

As shown in FIG. 1, a method for multi-policy conflict avoidance in an autonomous network of the invention includes:

Step 1: collecting network state information, wherein the network state information includes a network topology, configuration information and key network data in a network traffic, such as a time delay, bandwidth, packet loss rate, etc.

Step 2: acquiring a set of multiple policies to be verified.

The step 2 intelligently generates a respective optimization or self-healing policy by using an AI algorithm according to network environment fluctuations based on collected network state information, or accept a user intent and translate the user intent into a network policy. Due to the complexity of the network, an optimization, self-healing, and intent configuration scheme usually needs multi-policy implementation.

Step 3: generating all multi-policy execution sequences based on the set of multiple policies, and then constructing a policy ordering space tree containing all multi-policy execution sequences by using a tree data structure, wherein a node of the tree represents a network state, an edge represents a network command, and a path from a root to a leaf represents a sequential execution process of a network starting from an initial state according to network commands on edges, and wherein each of the multi-policy execution sequences is transformed into a path from the root to a leaf node of the tree.

That is to say, if the number of policies in the set of multiple policies is n, the policy ordering space tree contains n! paths from the root to the leaf node.

Step 4: performing a depth-first traversal on the policy ordering space tree; extracting a multi-policy execution sequence to be verified from the policy ordering space tree; then taking the network state information of step 1 as the initial state of the network, and formally simulating a forwarding table of each network element in the network by using software, so as to construct an initial simulation data plane; then injecting each policy in the multi-policy execution sequence to be verified into the simulation data plane one by one in sequence; simulating and calculating a simulation data plane generated after each policy is executed; and storing all generated simulation data planes.

In step 4, an entry of the forwarding table of each network element consists of triples (match, priority, action), where the match represents a packet header match field, the priority represents the priority of a forwarding policy, and the action represents an operation when a packet is matched. The invention records an initial simulation state of the network. Each time a new policy is inserted, the forwarding table of an original simulation data plane is incrementally updated according to the match (match field) of each data packet in the new policy. policies are injected into the currently simulated simulation data plane one by one according to the multi-policy execution sequence, and a simulation data plane obtained after inserting each new policy is stored (when the number of policies is n, only the latest n simulation data planes are stored). Each time the simulation data plane is updated, the invention checks whether it can be updated on the basis of the stored simulation data plane, thereby improving data plane modeling efficiency. After all multi-policies to be verified are inserted in sequence, a network conflict checking is performed on the generated n simulation data planes.

Step 5: detecting whether there is a conflict in the simulation data plane generated after each policy in the multi-policy execution sequence to be verified is executed, wherein the conflict may include a loop, a black hole or a firewall conflict; forming a conflict policy sequence according thereto; then inferring dependencies among multiple policies in the conflict policy sequence; pruning the policy ordering space tree; finally selecting a multi-policy execution sequence avoiding conflicts; and updating the multiple policies to an actual network data plane in sequence.

Figure 2:
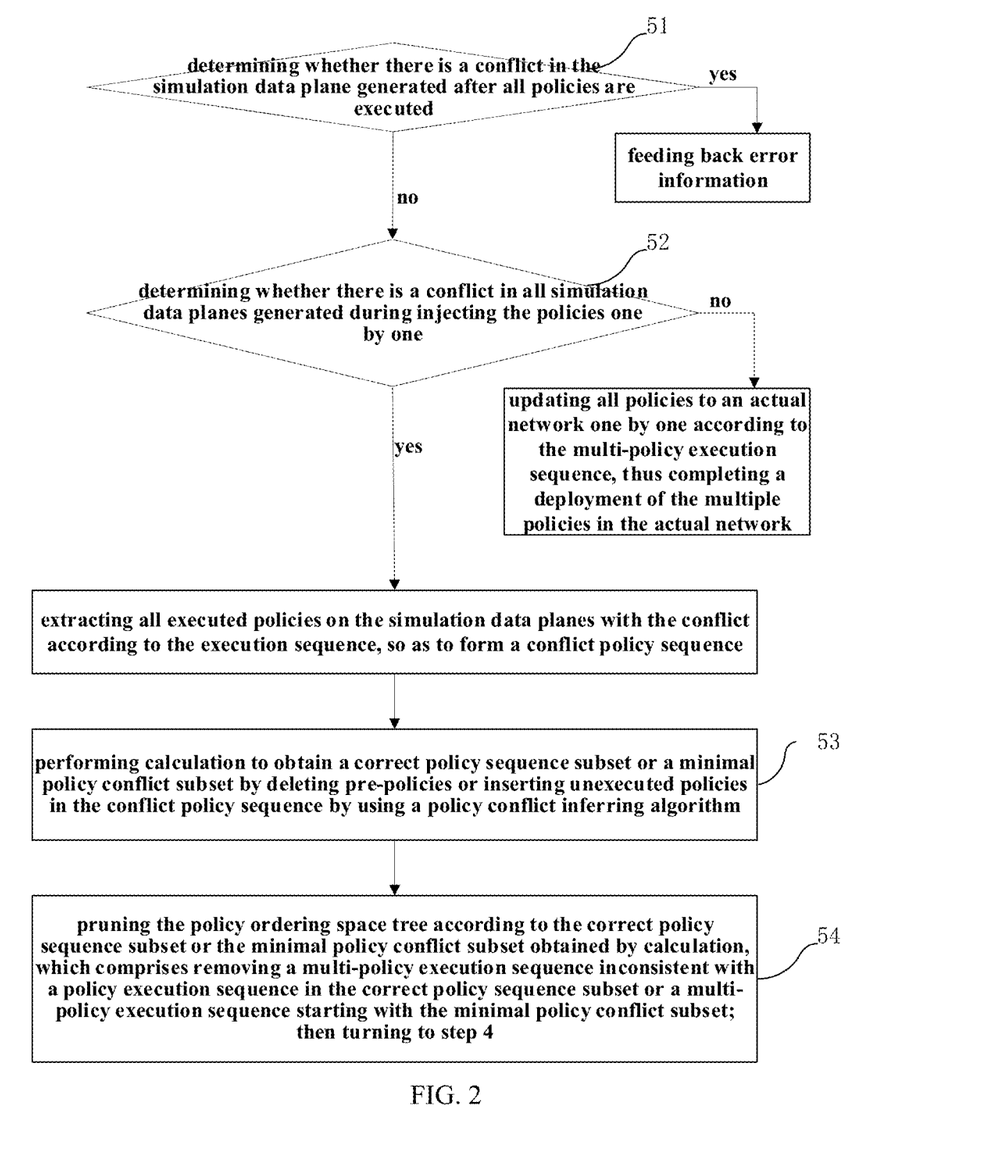
FIG. 2 is a flowchart of specific implementation steps of step 5 in FIG. 1.

The invention not only verifies whether the final state of the network after all policies in the set of multiple policies are updated is stable, but also verifies the intermediate state of the network during updating of the multiple policies one by one in sequence. And the invention adjusts the error sequence in time, so as to obtain the multi-policy execution sequence ensuring that each intermediate state of the network is stable. As shown in FIG. 2, step 5 may further include:

- step 51: determining whether there is a conflict in the simulation data plane generated after all policies are executed, wherein if there is a conflict, which indicates that there is an unavoidable network conflict in the set of multiple policies regardless of the multi-policy execution sequence, feeding back error information, and then ending a current procedure; if there is no conflict, continuing to a next step;
- step 52: determining whether there is a conflict in all simulation data planes generated during injecting the policies one by one; wherein if there is a conflict, extracting all executed policies on the simulation data planes with the conflict according to the execution sequence, so as to form a conflict policy sequence, and continuing to a next step; if there is no conflict, which indicates that the multi-policy execution sequence to be verified is a correct execution sequence, updating all policies to an actual network one by one according to the multi-policy execution sequence, thus completing a deployment of the multiple policies in the actual network, and ending a current procedure;
- step 53: performing calculation to obtain a correct policy sequence subset or a minimal policy conflict subset by deleting pre-policies or inserting unexecuted policies in the conflict policy sequence by using a policy conflict inferring algorithm;
- step 54: pruning the policy ordering space tree according to the correct policy sequence subset or the minimal policy conflict subset obtained by calculation, which comprises removing a multi-policy execution sequence inconsistent with a policy execution sequence in the correct policy sequence subset or a multi-policy execution sequence starting with the minimal policy conflict subset; then turning to step 4;
- wherein detecting whether there is a conflict in the simulation data plane may further include:
- performing a depth-first traversal on the forwarding table of each network element in the simulation data plane, and checking whether packets with the same match field encounter path loops during the traversal, whether there is no corresponding processing rule at a certain node, or whether an access control list of a current node is violated.

Figure 3:
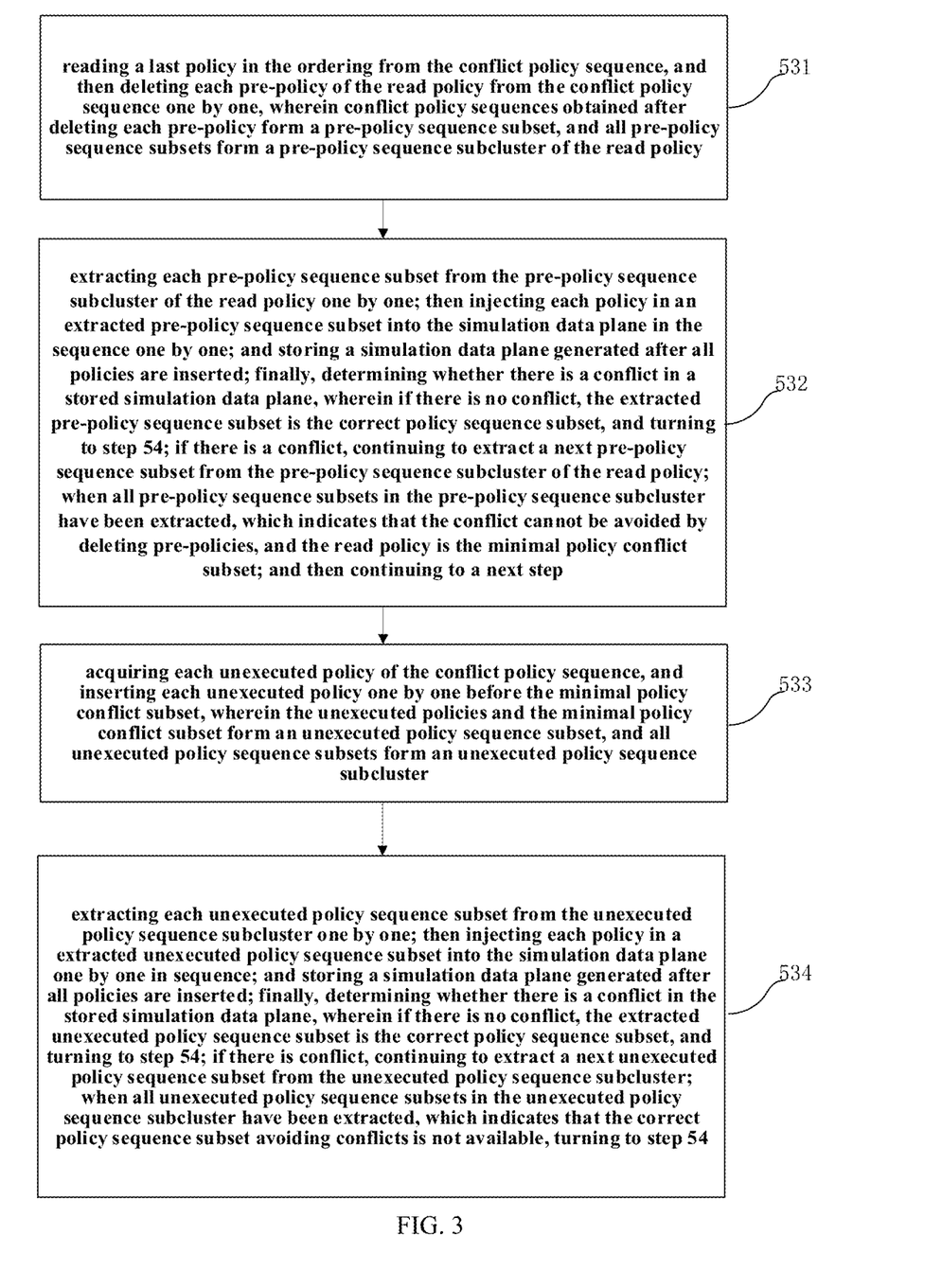
FIG. 3 is a flowchart of specific implementation steps of step 53 in FIG. 2.

As shown in FIG. 3, step 53 may further include:

Step 531: reading a last policy in the ordering from the conflict policy sequence, and then deleting each pre-policy of the read policy from the conflict policy sequence one by one, wherein conflict policy sequences obtained after deleting each pre-policy form a pre-policy sequence subset, and all pre-policy sequence subsets form a pre-policy sequence subcluster of the read policy.

The pre-policy is one or more policies before the read policy in the conflict policy sequence.

Step 532: extracting each pre-policy sequence subset from the pre-policy sequence subcluster of the read policy one by one; then injecting each policy in an extracted pre-policy sequence subset into the simulation data plane in the sequence one by one; and storing a simulation data plane generated after all policies are inserted; finally, determining whether there is a conflict in a stored simulation data plane, wherein if there is no conflict, the extracted pre-policy sequence subset is the correct policy sequence subset, and turning to step 54; if there is a conflict, continuing to extract a next pre-policy sequence subset from the pre-policy sequence subcluster of the read policy; when all pre-policy sequence subsets in the pre-policy sequence subcluster have been extracted, which indicates that the conflict cannot be avoided by deleting pre-policies, and the read policy is the minimal policy conflict subset; and then continuing to a next step.

Step 533: acquiring each unexecuted policy of the conflict policy sequence, and inserting each unexecuted policy one by one before the minimal policy conflict subset, wherein the unexecuted policies and the minimal policy conflict subset form an unexecuted policy sequence subset, and all unexecuted policy sequence subsets form an unexecuted policy sequence subcluster.

The unexecuted policies are the other policies in the multi-policy execution sequence that do not belong to the conflict policy sequence.

Step 534: extracting each unexecuted policy sequence subset from the unexecuted policy sequence subcluster one by one; then injecting each policy in a extracted unexecuted policy sequence subset into the simulation data plane one by one in sequence; and storing a simulation data plane generated after all policies are inserted; finally, determining whether there is a conflict in the stored simulation data plane, wherein if there is no conflict, the extracted unexecuted policy sequence subset is the correct policy sequence subset, and turning to step 54; if there is conflict, continuing to extract a next unexecuted policy sequence subset from the unexecuted policy sequence subcluster; when all unexecuted policy sequence subsets in the unexecuted policy sequence subcluster have been extracted, which indicates that the correct policy sequence subset avoiding conflicts is not available, turning to step 54.

In order to explain an implementation process of step 53 more clearly, a multi-policy execution sequence a-b-c-d to be verified will be taken as an example in the following. In step 4, the multi-policy execution sequence a-b-c-d to be verified is injected into the simulation data plane. In step 5, it is detected that there is no conflict in the simulation data plane inserted with policies a and b, but there is a conflict in the simulation data plane inserted with policy c, thus obtaining a conflict policy sequence a-b-c:

- step a: reading the last policy c in the ordering from the conflict policy sequence a-b-c, and deleting pre-policies a, b and ab of c, so as to obtain pre-policy sequence subsets: b-c, a-c and c (corresponding to step 531);
- step b: verifying that the simulation data planes corresponding to the pre-policy sequence subsets b-c, a-c and c are abnormal, and obtaining a minimal policy conflict subset c (corresponding to step 532);
- step c: inserting the unexecuted policy d before the minimal conflict subset c and obtaining an unexecuted policy sequence subset: d-c (corresponding to step 533);
- step d: verifying that there is no conflict in the simulation data plane corresponding to the unexecuted policy sequence subset d-c to obtain the correct policy sequence subset d-c, and pruning the policy ordering space tree according thereto (corresponding to step 534).

Figure 4:
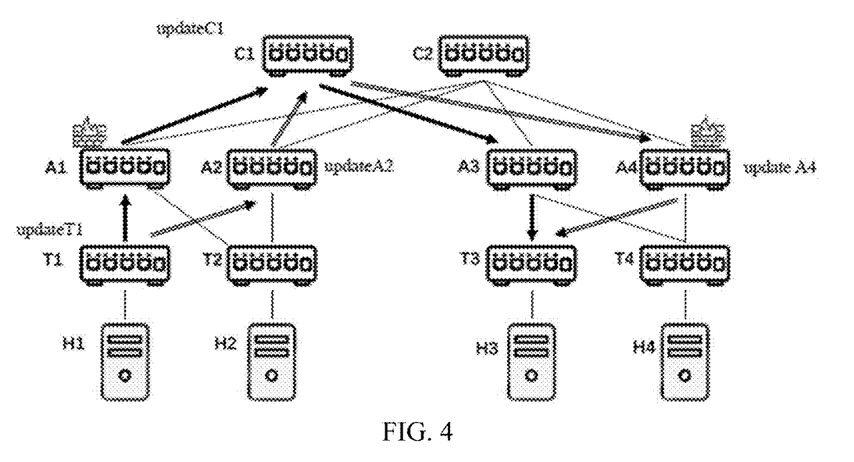
FIG. 4 is a network topology diagram of a small data center embodiment to which the invention is applied.

FIG. 4 is an embodiment of a network topology diagram of a small data center to which the invention is applied. As shown in FIG. 4, it includes two core switches (C1, C2), four aggregation switches (A1, A2, A3, A4), four access switches (T1, T2, T3, T4) and four hosts (H1, H2, H3, H4). It is assumed that the user intent is received: a traffic path from H1 to H3 is switched from T1-A1-C1-A3-T3 to T1-A2-C1-A4-T3, and it is ensured that all data packets in this traffic are filtered through a firewall at A1 or A4. Firstly, the user intent is translated to generate a set of corresponding network configuration policies, including four policies in total, wherein the four policies includes: updateA2: adding a flow entry of switch A2, and forwarding a packet with a source address from H1 to C1; updateA4: adding a flow table entry of switch A4, and forwarding a data packet with a source address from H1 to T3; updateT1: modifying a flow table entry of switch T1, and forwarding a data packet with a source address from H1 to A2; updateC1: modifying a flow table entry of switch C1, and forwarding a packet with a source address from H1 to A4. Then:

(1) A policy ordering space tree of the four policies is constructed, and a sequence of updateA2-updateA4-updateT1-updateC1 is selected based on the depth-first traversal. The behavior of updating it to the data plane is simulated, and the simulation data plane inserted with each command step by step is generated respectively. It is checked via a feasibility verification algorithm that the final state of the network is stable after the four commands are updated completely. However, when the simulation network has executed the policy of updateA2-updateA4-updateT1, it is found that there is a network abnormality that the packets from H1 to H3 bypass the firewalls at A1 and A4 at the same time.

(2) The conflict policy sequence of updataA2-updataA4-updataT1 is analyzed by using the policy conflict inferring algorithm. By verifying that the conflict still exists after deleting pre-policies updataA2 and updataA4 of updataT1, it is determined that updataT1 is the minimal policy conflict subset, which directly leads to the network abnormality of packets bypassing the firewall at A1 and not passing through the firewall at A4. Then, it is attempted to introduce the unexecuted policy updateC1 to solve the policy conflict, and determine that updateC1-updateT1 is the correct policy sequence subset, thus avoding this conflict.

(3) The policy ordering space tree is pruned and optimized by using the correct policy sequence subset obtained by calculation. It is preferred to consider the multi-policy execution sequence including the correct policy sequence update subset of updateC1-updateT1, and it is attempted to calculate the feasibility of the sequence of updateA2-updateA4-updateC1-updateT1. If the respective network simulation data plane obtained by sequentially inserting each command step by step is stable, it is determined as the correct execution sequence to realize the set of multi policies of the network. Finally, the corresponding flow tables are updated to the actual network data plane in sequence.

The above describes only preferred embodiments of the present invention, and it is not intended to limit the invention. Any modifications, equivalents, improvements, etc. made within the spirit and principle of the invention should be included in the scope of the present invention.

The invention claimed is:

1. A method for multi-policy conflict avoidance in an autonomous network, comprising:

step 1: collecting network state information, wherein the network state information includes a network topology, configuration information and network data in a network traffic;

step 2: acquiring a set of multiple policies to be verified;

step 3: generating all multi-policy execution sequences based on the set of multiple policies, and then constructing a policy ordering space tree containing all multi-policy execution sequences by using a tree data structure, wherein a node of the tree represents a network state, an edge represents a network command, and a path from a root to a leaf represents a sequential execution process of a network starting from an initial state according to network commands on edges, and wherein each of the multi-policy execution sequences is transformed into a path from the root to a leaf node of the tree;

step 4: performing a depth-first traversal on the policy ordering space tree; extracting a multi-policy execution sequence to be verified from the policy ordering space tree; then taking the network state information of step 1 as the initial state of the network, and formally simulating a forwarding table of each network element in the network by using software, so as to construct an initial simulation data plane; then injecting each policy in the multi-policy execution sequence to be verified into the simulation data plane one by one in sequence; simulating and calculating a simulation data plane generated after each policy is executed; and storing all generated simulation data planes; and step 5: detecting whether there is a conflict in the simulation data plane generated after each policy in the multi-policy execution sequence to be verified is executed;

forming a conflict policy sequence according thereto; then inferring dependencies among multiple policies in the conflict policy sequence; pruning the policy ordering space tree; finally selecting a multi-policy execution sequence avoiding conflicts; and updating the multiple policies to an actual network data plane in sequence.

2. The method according to claim 1, wherein, in step 4, an entry of the forwarding table of each network element consists of triples (match, priority, action), wherein the match represents a packet header match field, the priority represents a priority of a forwarding policy, and the action represents an operation when a packet is matched.

3. The method according to claim 1, wherein the step 5 further comprises:

step 51: determining whether there is a conflict in the simulation data plane generated after all policies are executed, wherein if there is a conflict, which indicates that there is an unavoidable network conflict in the set of multiple policies regardless of the multi-policy execution sequence, feeding back error information, and ending a current procedure; if there is no conflict, continuing to a next step;

step 52: determining whether there is a conflict in all simulation data planes generated during injecting the policies one by one; wherein if there is a conflict, extracting all executed policies on the simulation data planes with the conflict according to the execution sequence, so as to form a conflict policy sequence, and then continuing to a next step; if there is no conflict, which indicates that the multi-policy execution sequence to be verified is a correct execution sequence, updating all policies to an actual network one by one according to the multi-policy execution sequence, thus completing a deployment of the multiple policies in the actual network, and ending a current procedure;

step 53: performing calculation to obtain a correct policy sequence subset or a minimal policy conflict subset by deleting pre-policies or inserting unexecuted policies in the conflict policy sequence by using a policy conflict inferring algorithm; and step 54: pruning the policy ordering space tree according to the correct policy sequence subset or the minimal policy conflict subset obtained by calculation, which comprises removing a multi-policy execution sequence inconsistent with a policy execution sequence in the correct policy sequence subset or a multi-policy execution sequence starting with the minimal policy conflict subset; then turning to step 4.

4. The method according to claim 3, wherein the step 53 further comprises:

step 531: reading a last policy in the ordering from the conflict policy sequence, and then deleting each pre-policy of the read policy from the conflict policy sequence one by one, wherein conflict policy sequences obtained after deleting each pre-policy form a pre-policy sequence subset, and all pre-policy sequence subsets form a pre-policy sequence subcluster of the read policy;

step 532: extracting each pre-policy sequence subset from the pre-policy sequence subcluster of the read policy one by one; then injecting each policy in an extracted pre-policy sequence subset into the simulation data plane in the sequence one by one; and storing a simulation data plane generated after all policies are inserted; finally, determining whether there is a conflict in a stored simulation data plane, wherein if there is no conflict, the extracted pre-policy sequence subset is the correct policy sequence subset, and turning to step 54; if there is a conflict, continuing to extract a next pre-policy sequence subset from the pre-policy sequence subcluster of the read policy; when all pre-policy sequence subsets in the pre-policy sequence subcluster have been extracted, which indicates that the conflict cannot be avoided by deleting pre-policies, and the read policy is the minimal policy conflict subset, then continuing to a next step;

step 533: acquiring each unexecuted policy of the conflict policy sequence, and inserting each unexecuted policy one by one before the minimal policy conflict subset, wherein the unexecuted policies and the minimal policy conflict subset form an unexecuted policy sequence subset, and all unexecuted policy sequence subsets form an unexecuted policy sequence subcluster; and step 534: extracting each unexecuted policy sequence subset from the unexecuted policy sequence subcluster one by one; then injecting each policy in an extracted unexecuted policy sequence subset into the simulation data plane one by one; and storing a simulation data plane generated after all policies are inserted; finally, determining whether there is a conflict in the stored simulation data plane, wherein if there is no conflict, the extracted unexecuted policy sequence subset is the correct policy sequence subset, and turning to step 54; if there is conflict, continuing to extract a next unexecuted policy sequence subset from the unexecuted policy sequence subcluster; when all unexecuted policy sequence subsets in the unexecuted policy sequence subcluster have been extracted, which indicates that the correct policy sequence subset avoiding conflicts is not available, turning to step 54.

5. The method according to claim 3, wherein detecting whether there is a conflict, comprising a loop, a black hole or a firewall conflict, in the simulation data plane further comprises:

performing a depth-first traversal on the forwarding table of each network element in the simulation data plane, and checking whether packets with the same match field encounter path loops during the traversal, whether there is no corresponding processing rule at a node, or whether an access control list of a current node is violated.

6. The method according to claim 4, wherein detecting whether there is a conflict, comprising a loop, a black hole or a firewall conflict, in the simulation data plane further comprises:

performing a depth-first traversal on the forwarding table of each network element in the simulation data plane, and checking whether packets with the same match field encounter path loops during the traversal, whether there is no corresponding processing rule at a node, or whether an access control list of a current node is violated.

* * * * *